(12) United States Patent
Paredes Gonzalez et al.

(10) Patent No.: US 10,745,112 B2
(45) Date of Patent: Aug. 18, 2020

(54) METHOD AND SYSTEM FOR DELAYING LAMINAR-TO-TURBULENT TRANSITION IN HIGH-SPEED BOUNDARY LAYER FLOW

(71) Applicant: U.S.A. AS REPRESENTED BY THE ADMINISTRATOR OF NASA, Washington, DC (US)

(72) Inventors: Pedro Paredes Gonzalez, Hampton, VA (US); Meelan M. Choudhari, Yorktown, VA (US); Fei Li, Newport News, VA (US)

(73) Assignee: UNITED STATES OF AMERICA AS REPRESENTED BY THE ADMINSTRATOR OF NASA, Washington, DC (US)

( * ) Notice: Subject to any disclaimer, the term of this patent is extended or adjusted under 35 U.S.C. 154(b) by 402 days.

(21) Appl. No.: 15/784,878

(22) Filed: Oct. 16, 2017

(65) Prior Publication Data
US 2018/0105258 A1    Apr. 19, 2018

Related U.S. Application Data

(60) Provisional application No. 62/408,154, filed on Oct. 14, 2016, provisional application No. 62/408,165, (Continued)

(51) Int. Cl.
*B64C 21/04* (2006.01)
*B64C 21/10* (2006.01)
(Continued)

(52) U.S. Cl.
CPC .............. *B64C 21/04* (2013.01); *B64C 21/08* (2013.01); *B64C 21/10* (2013.01); *B64C 23/005* (2013.01);
(Continued)

(58) Field of Classification Search
CPC ......... B64C 21/00; B64C 21/02; B64C 21/04; B64C 21/10; B64C 23/00; B64C 23/005;
(Continued)

(56) References Cited

U.S. PATENT DOCUMENTS

| 4,185,558 A | 1/1980 | Quinville |
| 4,363,237 A | 12/1982 | Creel, Jr. et al. |

(Continued)

FOREIGN PATENT DOCUMENTS

| EP | 2466288 A2 | 6/2012 |
| EP | 2636594 B1 | 1/2017 |
| WO | 2014120328 A9 | 8/2014 |

OTHER PUBLICATIONS

Bagheri et al., "The Stabilizing Effect of Streaks on Tollmien-Schlichting and Obliques Waves: A Parametric Study," Physics of Fluids, 2007, 19, 078103.
(Continued)

*Primary Examiner* — Richard G Davis
(74) *Attorney, Agent, or Firm* — Robin W. Edwards; Helen M. Galus (57) ABSTRACT

A method and system delay the laminar-to-turbulent transition of a supersonic or hypersonic boundary layer flow moving in a flow direction over a surface. For supersonic boundary layer flow, oblique first-mode instability waves present in the boundary layer and propagating at an oblique angle relative to the flow direction cause a laminar-to-turbulent transition in the boundary layer flow. These instability waves have a wavelength associated therewith in a direction perpendicular to the flow direction. Flow disruptors are used to generate modulations within the boundary layer flow wherein a wavelength of the modulations along the direction perpendicular to the flow direction is less than one-half of the wavelength of the instability waves. For hypersonic boundary layer flow, the flow disruptors generate
(Continued)

modulations within the boundary layer flow wherein the wavelength of the modulations is less than streak spacing for optimal transient growth or, equivalently, in the range of one to two times the boundary layer thickness.

23 Claims, 4 Drawing Sheets

Related U.S. Application Data filed on Oct. 14, 2016, provisional application No. 62/492,411, filed on May 1, 2017.

(51) Int. Cl.
*B64C 30/00* (2006.01)
*B64C 23/06* (2006.01)
*B64C 23/00* (2006.01)
*B64C 21/08* (2006.01)

(52) U.S. Cl.
CPC .............. *B64C 23/06* (2013.01); *B64C 30/00* (2013.01); *B64C 2230/04* (2013.01); *B64C 2230/06* (2013.01); *B64C 2230/12* (2013.01); *B64C 2230/26* (2013.01); *Y02T 50/162* (2013.01); *Y02T 50/166* (2013.01)

(58) Field of Classification Search
CPC ..... B64C 23/04; B64C 23/06; B64C 2230/00; B64C 2230/04; B64C 2230/06; B64C 2230/16; B64C 2230/26
See application file for complete search history.

(56) References Cited

U.S. PATENT DOCUMENTS

| | | | |
|---|---|---|---|
| 5,322,242 A | 6/1994 | Tracy | |
| 5,348,256 A | 9/1994 | Parikh | |
| 5,518,204 A | 5/1996 | Tracy | |
| 5,538,201 A | 7/1996 | Gerhardt | |
| 5,884,871 A | 3/1999 | Fedorov et al. | |
| 5,897,076 A | 4/1999 | Tracy | |
| 6,149,101 A | 11/2000 | Tracy | |
| 8,939,410 B2 * | 1/2015 | Exton | B64C 23/00 244/130 |
| 9,031,817 B2 | 5/2015 | Yoshida et al. | |
| 2017/0240271 A1 * | 8/2017 | Fasel | B64C 21/08 |

OTHER PUBLICATIONS

Cossu et al., "Stabilization of Tollmien-Schlichtiing Waves by Finite Amplitude Optimal Streaks in the Blasius Boundary Layer," Physics of Fluids, 2002, vol. 14. No. 8.

Fransson et al., "Delaying Transition to Turbulence by a Passive Mechanism," Physical Review Letters, 2000, 96, 064501.

Fransson et al., "On the Generation of Steady Streamwise Streaks in Flat-Plate Boundary Layers," Journal of Fluid Mechanics, 2012, pp, 211-234, vol. 698.

Gaster, M., "On the Flow Along Swept Leading Edges," Aeronaut Q., 1967, pp. 105-154, vol. XVIII, pt. 2.

Goldstein, M. E. et al., "Nonlinear Wakes Behind a Flow of Elongated Roughness Elements," Journal of Fluid Mechanics, 2015, pp. 516-557, vol. 796.

Lynde. M. N. et al.,"Expanding the Natural Laminar Flow Boundary for Supersonic Transports," AIAA Aviation Forum, Jun. 13-17, 2015, AIAA Applied Aerodynamics Conference, 23 pages.

Mayer, C. S. J. et al., "Transition Onset Predictions for Oblique Breakdown in a Mach 3 Boundary Layer," AIAA Journal, 2014, pp. 882-885, vol. 52, No. 4, Technical Notes.

Poll, D. I. A., "Some Observations of the Transition Process on the Windward Face of a Long Yawed Cylinder," Journal of Fluid Mechanics, 1985, pp. 329-356, vol. 150.

Powell, A.G. et al., 2006, "Attachment-line Tripping Due to Suction Through a Microperforated Skin at Mach2," AIAA Paper 2006-3221.

Yoshida, "Supersonic Drag Reduction Technology in the Scaled Supersonic Experimental Airplane Project by JAXA," Progress in Aerospace Sciences, 2009, pp. 124-146, vol. 45.

Anders, S. G. et al., "F-16XL-2 Supersonic Laminar Flow Control Flight Test Experiment," NASA/TP-1999-209683, Dec. 1999, pp. 1-262.

Malik, M. R., "Prediction and Control of Transition in Supersonic and Hypersonic Boundary Layers," AIAA Journal, Nov. 1989, pp. 1487-1493, vol. 27, No. 11.

Fujii, K., "Experiment of the Two-Dimensional Roughness Effect on Hypersonic Boundary-Layer Transition," Journal of Spacecraft and Rockets, 2006, pp. 731-738, vol. 43, No. 4.

Holloway, P. F. et al., "Effect of Controlled Surface Roughness on Boundary-Layer Transition and Heat Transfer at Mach Numbers of 4.8 and 6.0," NASA TN D-2054, Apr. 1964.

James, C. S., "Boundary-Layer Transition on Hollow Cylinders in Supersonic Free Flight as Affected by Mach Number and a Screwthread Type of Surface Roughness," NASA MEMO 1-20-59A, Feb. 1959, pp. 1-49.

Jewell, J. S. et al., "Effect of Gas Injection on Transition in Hypervelocity Boundary Layers," Proceedings of the 28th International Symposium in Shock Waves, Jul. 17-22, 2011, pp. 1-6.

\* cited by examiner

METHOD AND SYSTEM FOR DELAYING LAMINAR-TO-TURBULENT TRANSITION IN HIGH-SPEED BOUNDARY LAYER FLOW

CROSS-REFERENCE TO RELATED PATENT APPLICATION(S)

This patent application claims the benefit of and priority to provisional application Nos. 62/408,154 filed on Oct. 14, 2016, 62/408,165 filed on Oct. 14, 2016 and 62/492,411 filed on May 1, 2017, the contents of each hereby incorporated by reference in their entireties.

STATEMENT REGARDING FEDERALLY SPONSORED RESEARCH OR DEVELOPMENT

The invention described herein was made in part by an employee of the United States Government and may be manufactured and used by and for the Government of the United States for governmental purposes without the payment of any royalties thereon or therefore.

BACKGROUND OF THE INVENTION

It is well-established in aerodynamics that boundary layer transition from a laminar flow to a turbulent flow leads to large increases in skin friction on an aerodynamic surface. Therefore, delaying a boundary layer's laminar-to-turbulent transition (or "BLT" as it is known in the art) can produce a significant reduction in the overall drag experienced by an aerodynamic surface.

In the subsonic or incompressible boundary layer case, there are streamwise or planar Tollmien-Schlichting (TS) instability waves as well as oblique TS instability waves where "obliqueness" is viewed relative to the streamwise direction. However, in the subsonic or incompressible boundary layer regime, only streamwise or planar TS instability waves are of concern since they are the ones that first amplify sufficiently to cause BLT. In the presence of free stream turbulence or discrete-roughness-elements, one observes narrow, streamwise elongated regions of alternating high and low streamwise velocity in the boundary layer. These elongated regions are known in the art as "streaks". As is also known in the art, streaks stabilize the unstable and streamwise TS waves and weakly oblique TS waves when the wavelengths of the TS waves are between four and five times that of the streak wavelength.

In the supersonic and hypersonic regimes, the mechanism causing BLT is very different as the most amplified (or dominant) instabilities correspond to highly oblique first-mode waves for supersonic and planar/axisymmetric Mack mode waves for hypersonic. Furthermore, the compressible boundary layer always exhibits a generalized inflection point that induces the inviscid instability characteristic to the instability waves that is not present in favorable to weakly-adverse pressure gradient incompressible boundary layers. At supersonic speeds, which correspond to Mach numbers higher than 1 but roughly lower than 5, the generalized inflection point of the compressible boundary layer leads to the highly obliqueness of the first mode waves. At hypersonic speeds, which correspond to Mach numbers roughly higher than 5, a region of relative supersonic flow induces the acoustic mode characteristic to the inviscid Mack mode waves. Although the dominant inviscid Mack-mode waves in hypersonic flow are planar as the viscous TS waves in the subsonic flow, they are fundamentally different because of the physical mechanisms that lead to their exponential growth. As is known in the art of BLT in a supersonic boundary layer, the BLT process involving oblique first-mode instabilities is characterized by a strong amplification of stationary streamwise streaks, and further, that artificial suppression of such streaks has been shown to delay the onset of BLT. In a hypersonic boundary layer, the BLT process involving planar/axisymmetric Mack-mode instabilities is characterized by the non-linear saturation of the Mack-mode waves and subsequent three-dimensional secondary instability that quickly lead to the onset of BLT.

BRIEF SUMMARY OF THE INVENTION

The present invention is an apparatus for delaying the laminar-to-turbulent transition of a supersonic or hypersonic boundary layer flow. A plurality of flow disruptors are provided and are adapted to be in contact with a boundary layer flow moving in a flow direction over a surface. For supersonic boundary layer flow, oblique first-mode instability waves present in the boundary layer and propagating at an oblique angle relative to the flow direction cause a laminar-to-turbulent transition in the boundary layer flow. These instability waves have a wavelength associated therewith in a direction orthogonal to the flow direction along the edge of the boundary layer. The flow disruptors generate modulations within the boundary layer flow wherein the wavelength of the modulations is less than one-half of the wavelength of the instability waves. For hypersonic boundary layer flow, the flow disruptors generate modulations within the boundary layer flow wherein the wavelength of the modulations is less than streak spacing for optimal transient growth or, equivalently, in the range of one to two times the boundary layer thickness.

One embodiment of the invention is an apparatus for delaying the laminar-to-turbulent transition of a supersonic boundary layer flow. A plurality of flow disruptors are provided and are adapted to be in contact with a boundary layer flow moving in a flow direction over a surface. A portion of the oblique first-mode instability waves present in the boundary layer and propagating at an oblique angle relative to the flow direction cause a laminar-to-turbulent transition in the boundary layer flow. This portion of the instability waves has a preferred range of wavelengths in a direction perpendicular to the flow direction. The flow disruptors are arranged approximately perpendicular to the flow direction. The flow disruptors generate modulations within the boundary layer flow that are perpendicular to the flow direction and have a modulation wavelength associated therewith. Peaks of the modulations are aligned with the flow direction. Troughs of the modulations are aligned with the flow direction. The flow disruptors control the modulation wavelength of the modulations to be less than one-half of the wavelength of the portion of the instability waves causing the laminar-to-turbulent transition.

Another embodiment of the invention is an apparatus for delaying the laminar-to-turbulent transition of a hypersonic boundary layer flow. A plurality of flow disruptors are provided and are adapted to be in contact with a boundary layer flow moving in a flow direction over a surface. A portion of the planar/axisymmetric instability waves present in the boundary layer and propagating in the flow direction cause a laminar-to-turbulent transition in the boundary layer flow. The flow disruptors are arranged approximately perpendicular to the flow direction. The flow disruptors generate modulations within the boundary layer flow that are perpendicular to the flow direction and have a modulation wavelength associated therewith. Peaks of the modulations are aligned with the flow direction. Troughs of the modulations are aligned with the flow direction. The flow disruptors control the modulation wavelength of the modulations to be less than streak spacing for optimal transient growth or, equivalently, in the range of one to two times the boundary layer thickness.

Another embodiment of the invention is a method for delaying the laminar-to-turbulent transition of a supersonic boundary layer flow moving in a flow direction over a surface. Oblique first-mode instability waves present in the boundary layer and propagating at an oblique angle relative to the flow direction cause a laminar-to-turbulent transition in the boundary layer flow. These instability waves have a wavelength associated therewith in a direction perpendicular to the flow direction. The method involves generating modulations within the boundary layer flow wherein a modulation wavelength of the modulations is less than one-half of the wavelength of the instability waves.

A further embodiment of the invention is a method for delaying the laminar-to-turbulent transition of a hypersonic boundary layer flow moving in a flow direction over a surface. The planar/axisymmetric instability waves present in the boundary layer and propagating in the flow direction cause a laminar-to-turbulent transition in the boundary layer flow. The method involves generating modulations within the boundary layer flow wherein a modulation wavelength of the modulations is less than streak spacing for optimal transient growth or, equivalently, in the range of one to two times the boundary layer thickness.

These and other features, advantages, and objects of the present invention will be further understood and appreciated by those skilled in the art by reference to the following specification, claims, and appended drawings.

DETAILED DESCRIPTION OF THE INVENTION

Figure 1:
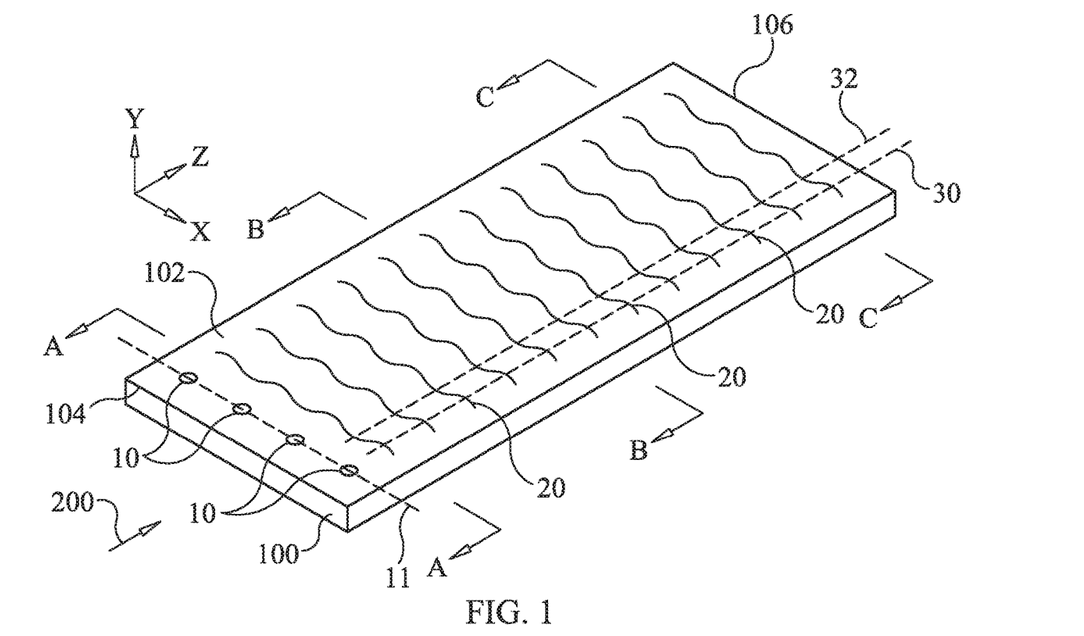
FIG. 1 is a schematic perspective view of an aerodynamic body disposed in a supersonic or hypersonic flow and having flow disruptors for delaying a laminar-to-turbulent transition in a boundary layer of the flow moving over the surface in accordance with an embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to the drawings and more particularly to FIG. 1, a portion of an aerodynamic body 100 is illustrated. For ease of illustration, aerodynamic body 100 is depicted as a planar body. However, it is to be understood that aerodynamic body 100 is representative of all major components of an airframe to include, but not limited to, wings, empennages, engine nacelles, the nose region of an aircraft fuselage, etc.

Aerodynamic body 100 has an exposed surface 102 over which air flows when aerodynamic body moves through an atmospheric region. In terms of the present invention, it will be assumed that aerodynamic body 100 is operating in the supersonic or hypersonic flight regime. As a result, the air flow moving over surface 102, known as the boundary layer flow, will be moving at a supersonic or hypersonic velocity. For ease of illustration in FIG. 1, the supersonic/hypersonic boundary layer flow over surface 102 is indicated in FIG. 1 using an arrow referenced by numeral 200. However, and as would be well-understood in the art, supersonic/hypersonic boundary layer flow 200 begins at a leading edge 104 of aerodynamic body 100 and extends to a trailing edge 106 of aerodynamic body 100.

Prior to describing the apparatus and method of the present invention that delays the laminar-to-turbulent transition (also called the boundary layer transition or "BLT" as it will be referred to hereinafter) occurring on aerodynamic body 100 in the presence of supersonic/hypersonic boundary layer flow 200, the mechanism causing the BLT will first be explained. For purposes of this explanation and throughout the remainder of the present invention's description, the following word conventions will be used. The movement direction of supersonic/hypersonic boundary layer flow 200 over surface 102 will be referred to simply as the "flow direction" or the "streamwise" direction, i.e., along the Z-dimension as noted in FIG. 1. The dimension extending perpendicular to the streamwise direction and along surface 102 will also be referred to as the "spanwise" direction or along the X-dimension as noted in FIG. 1. The "thickness" of flow 200 extends perpendicular to both the streamwise and spanwise directions or along the Y-dimension as noted in FIG. 1.

As mentioned above, the relative velocity between surface 102 and flow 200 is a supersonic/hypersonic velocity in the streamwise direction over surface 102. Aerodynamic body 100 is generally designed such that flow 200 will be laminar from leading edge 104 to some point on surface 102 downstream from leading edge 104. However, left unchecked or without modification, flow 200 develops instabilities at some point between leading edge 104 and trailing edge 106 where such instabilities cause flow 200 to transition from laminar to turbulent, i.e., the BLT. If the amplification of the instability waves can be significantly reduced, the BLT can be delayed or "pushed" closer to trailing edge 106, aerodynamic body 100 will experience a number of beneficial effects well-known in the art. In the supersonic flow regime, a major class of instabilities of concern is known as oblique first-mode instability waves. In the hypersonic flow regime, a major class of instabilities of concern is known as planar/axisymmetric Mack mode or, equivalently, second mode instability waves In supersonic boundary layer flow, the unstable modes of oblique first-mode waves correspond to a range of frequencies and spanwise wavelengths. That is, oblique first-mode instabilities consist of a plurality of waves. Each such wave has a fixed frequency and spanwise wavelength as well as a streamwise wavelength and streamwise amplification rate that are determined by the frequency and spanwise wavelength as well as the local boundary layer profiles. The obliqueness angle, which is determined by the ratio of the streamwise and spanwise wavelengths, evolves slowly along the flow direction of flow 200. The integrated amplification of each unstable wave entity (with a fixed frequency and spanwise wavelength) determines the level of significance associated with that wave entity. Since the amplification is exponential with respect to the streamwise distance, the amplitude spectrum at any given location is expected to decay rapidly away from the peak frequency and wavelength combination. Therefore, it is possible to associate a narrow range of wave entities (i.e., frequency-spanwise wavelength combinations in the neighborhood of that for the most amplified wave) as the likely cause of BLT.

In hypersonic boundary layer flow, the unstable modes of planar/axisymmetric Mack-mode waves correspond to a range of frequencies. That is, planar/axisymmetric Mack-mode instabilities consist of a plurality of waves. Each such wave has a fixed frequency as well as a streamwise wavelength and streamwise amplification rate that are determined by the frequency as well as the local boundary layer profiles. The integrated amplification of each unstable wave entity (with a fixed frequency) determines the level of significance associated with that wave entity. Since the amplification is exponential with respect to the streamwise distance, the amplitude spectrum at any given location is expected to decay rapidly away from the peak frequency. Therefore, it is possible to associate a narrow range of wave entities (i.e., frequencies in the neighborhood of that for the most amplified wave) as the likely cause of BLT.

Due to the streamwise evolution of the boundary layer profiles, the identity of the most dangerous modes likely to cause BLT also evolves slowly along the flow direction of flow 200. As is known in the art, there are a number of N-factor curves (i.e., logarithmic amplitude ratio curves) associated with the instability waves in an unperturbed boundary layer flow. A well-known technique for BLT prediction is based on the hypothesis that BLT is likely to occur after the N-factor envelope curve associated with the most amplified waves has reached a critical value. A narrow range of N-factor values has been found to correlate with BLT onset in a wide class of flows. In terms of the present invention for supersonic flow, the spanwise wavelength of the oblique first-mode instability wave causing BLT really refers to the spanwise wavelength that (approximately) divides the overall range of spanwise wavelengths based on their amplification ratios at the expected BLT location into two subgroups of transition-causing and not-transition-causing spanwise wavelengths regardless of frequency. For any given aerodynamic structure, the spanwise wavelength of the BLT-causing oblique first-mode instability wave can be determined using simulations or experimentation in ways well-understood in the art. For hypersonic flow, the dominant instability waves are planar/axisymmetric Mack-mode waves, so the only concern is to determine what frequencies are causing the BLT. Despite of the speed regime, either supersonic or hypersonic, the BLT-causing instability wave is also referred to herein as the "target wave". As will be explained further below, the present invention provides an apparatus and method to reduce the effects of the BLT-causing target wave (oblique first-mode instability wave in supersonic regime and planar/axisymmetric Mack-mode wave in hypersonic regime) in order to delay the onset of the BLT, i.e., push the BLT closer to trailing edge 106.

In general, the present invention employs the use of a number of flow disruptors 10 where each such flow disruptor engages flow 200 such that the flow disruptors introduce modulations (i.e., velocity variations) in flow 200 that delay the BLT as compared to the unperturbed case where no flow disruptors are used. In other words, the flow disruptors exert influence on the amplification of the above-described BLT-causing instability waves in a way that delays the onset of the BLT, i.e., pushing it closer to the trailing edge of the aerodynamic body.

Referring again to FIG. 1, a plurality of flow disruptors 10 are placed along a line (referenced by dashed line 11) that is perpendicular (or approximately so) to the flow direction of flow 200. That is, the resulting linear array of spaced-apart flow disruptors 10 extends along a spanwise direction of aerodynamic body 100. As will be explained further below for supersonic flow, the present invention serves to stabilize the BLT-causing first-mode instability waves having a wavelength that is greater than two times the wavelength of the flow modulations caused by flow disruptors 10. For hypersonic flow, the present invention serves to stabilize the BLT-causing planar/axisymmetric Mack-mode instability waves regardless of the spanwise modulation caused by flow disruptors 10.

Figure 2:
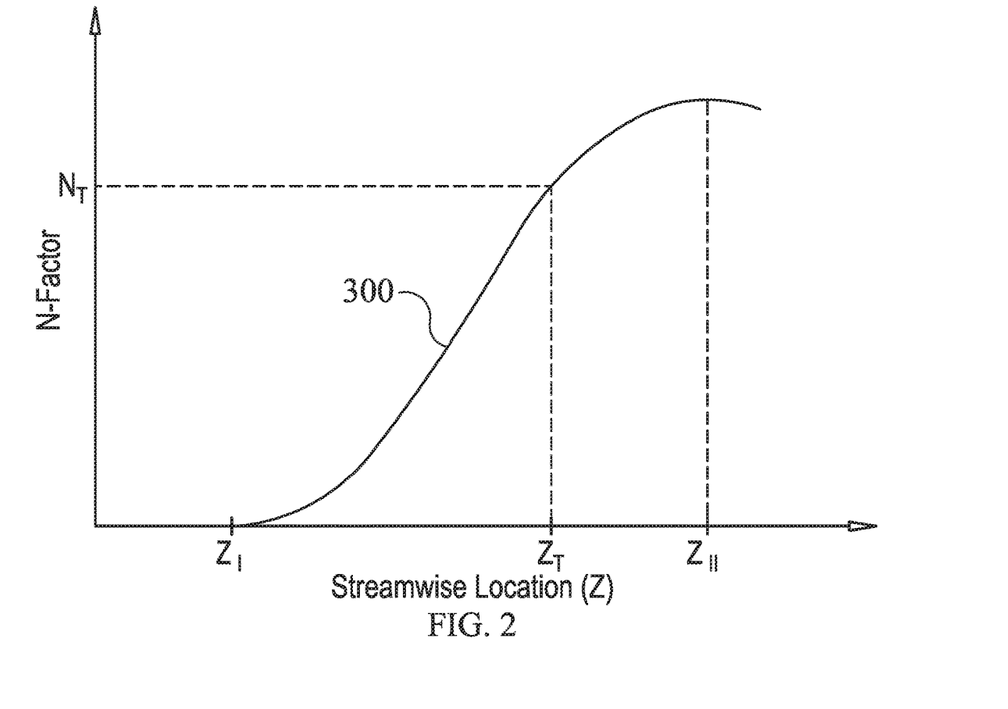
FIG. 2 is a plot of the N-factor curve for the oblique first-mode instability wave or planar/axisymmetric Mack-mode wave causing the laminar-to-turbulent transition in a boundary layer flow, where the so-called N-factor denotes the logarithmic amplification factor relative to the instability wave amplitude at the location where it first begins to amplify.

To avoid over control in supersonic flow, line 11 should be located at a streamwise location that will allow modulations 20 to delay the BLT without increasing the amplification of other non-BLT-causing first-mode instability waves. Simulation results indicate that the modulation 20 increase the amplification of non-BLT-cause first-mode instability waves with twice the wavelength of the modulation 20, and therefore the spacing and location of the flow disruptors 10 must be designed taking into account that these waves do not cause early BLT. For hypersonic flow, simulation results indicate that the modulation 20 always stabilizes the planar/axisymmetric Mack-mode instability waves. In general, the location of line 11 is between a position upstream of the first neutral location of the target wave causing BLT and a position upstream of the second neutral location of the target wave. The first and second neutral locations are indicated at streamwise locations $Z_I$ and $Z_{II}$, respectively, on the N-factor curve 300 (FIG. 2) associated with a target wave where the N-factor amplitude is plotted as a function of streamwise location Z. The target wave causes BLT at a streamwise transition location $Z_T$ where the N-factor value at $Z_T$ is NT. Additional linear arrays of spanwise-distributed flow disruptors can be located at one or more downstream spanwise regions of aerodynamic body 100 without departing from the scope of the present invention. In general, additional linear arrays would be placed at location(s) where the effect of the previous array is no longer effective. Furthermore, the additional linear arrays could have different spacings to each other to induce modulations with different spanwise wavelengths without departing from the scope of the present invention.

Figure 3:
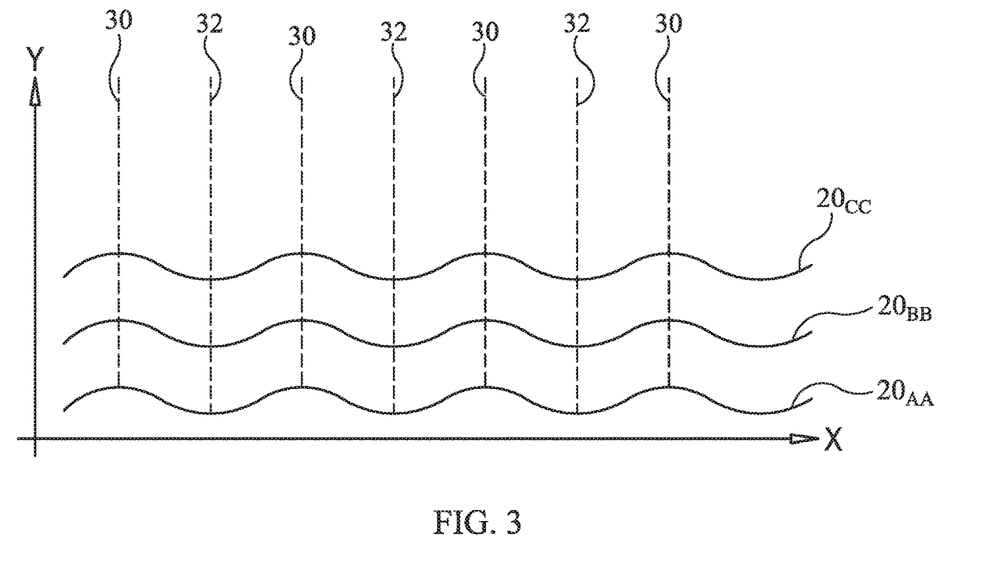
FIG. 3 is a plot of modulated streamwise velocities in the boundary layer as a function of the surface's span that results from the inclusion of flow disruptors in accordance with the present invention.

As mentioned above, flow disruptors 10 introduce modulations in flow 200 as flow 200 engages with flow disruptors 10. More specifically and as illustrated schematically in FIG. 1, modulations 20 are generated in the spanwise direction (i.e., perpendicular to flow 200) by the interaction of flow disruptors 10 with flow 200. Modulations 20, occurring all along the streamwise flow direction, alter the velocity profile of flow 200. The peaks and troughs of the streamwise arrangement of modulations 20 are aligned with the flow direction of flow 200 to thereby define alternating "streaks" of maximum and minimum velocities extending along the flow direction. For example, a streamwise series of aligned minimum velocity "streaks" are defined along dashed line 30 and a streamwise series of aligned maximum velocity "streaks" are defined along dashed line 32. The spanwise-varying velocity profile of three modulations 20 in flow 200 are illustrated graphically in FIG. 3 where the boundary-layer-edge velocity profile of modulation $20_{AA}$ occurs at streamwise location A-A in FIG. 1, the boundary-layer-edge velocity profile of modulation $20_{BB}$ occurs at streamwise location B-B in FIG. 1, and the boundary-layer-edge velocity profile of modulation $20_{CC}$ occurs at streamwise location C-C in FIG. 1. The peaks and troughs of the respective modulations are aligned in the streamwise direction. The wall-normal distance to the wall of the boundary-layer-edge velocity profiles increases in the streamwise direction because of the natural downstream development of the boundary layer that grows as the root square of the streamwise distance. The amplitude of the modulations can exhibit some short-distance growth and subsequent decay behind of the flow disruptors 10, because of the inherent non-modal growth phenomena occurring in a transformation of the counter-rotating streamwise vortices induced by the flow disruptors 10 into the streaks.

Figure 4:
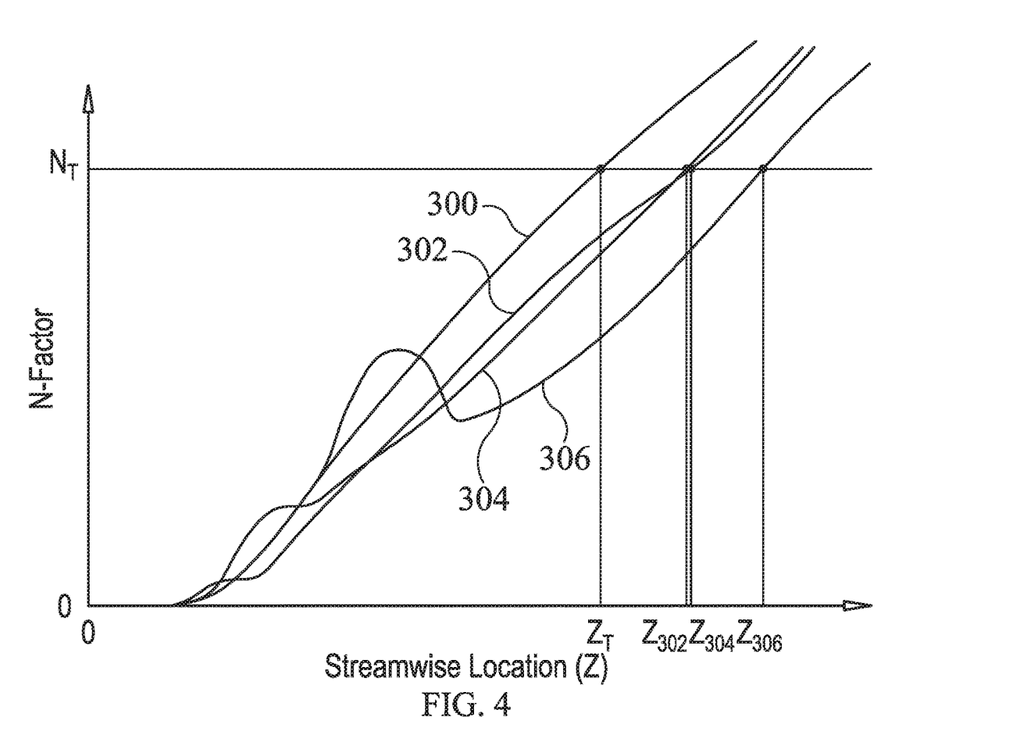
FIG. 4 is a plot of the N-factor envelope curve for the oblique first-mode instability (supersonic) or planar/axisymmetric Mack mode (hypersonic) waves causing the laminar-to-turbulent transition in a boundary layer flow, and three N-factor envelope curves of the same waves modified by flow disruptors to delay the laminar-to-turbulent transition in accordance with the present invention.

In supersonic boundary layer flow, flow disruptors 10 are designed to provide modulations 20 having a wavelength that is less than one-half the spanwise wavelength of the above-described BLT-causing oblique first-mode instability wave or target wave. In hypersonic boundary layer flow, flow disruptors 10 are designed to provide modulations 20 having a wavelength that is less than streak spacing for optimal transient growth or, equivalently, in the range of one to two times the boundary layer thickness. The specific spanwise wavelength of the modulation 20 can be optimized for a given aerodynamic structure. Support for this technique was illustrated in simulation results indicating that flow modulations 20 restricted as described above strongly affect the instability waves having a wavelength larger than twice that of the wavelength of modulations 20. The effects are illustrated in FIG. 4, where the N-factor curve 300 for the target wave unperturbed by any modulations as described herein is shown along with N-factor curves 302, 304 and 306 illustrating transformations of N-factor curve 300 in the presence of flow disruptors that introduce modulations whose wavelength is constrained as described herein. In each case, the BLT locations $Z_{302}$, $Z_{304}$ and $Z_{306}$ are delayed (i.e., pushed further downstream) as compared to the unperturbed BLT location $Z_T$ associated with the target wave form an unperturbed boundary layer flow. For an identical arrangement of flow disruptors, the amount of BLT delay is a function of location of the flow disruptors where the specific location can be optimized for a given aerodynamic structure, as well as the strength of modulations 20.

The flow disruptors of the present invention can be passive physical structures attached to or integrated with surface 102 with each such structure extending partially into the thickness of flow 200. The flow disruptors can also be active devices/structures controllable to interact with flow 200 at specified locations. Several non-limiting examples of passive and active devices or structures will be described with reference to FIGS. 5-7. Support for this technique was illustrated in simulation results indicating that flow modulations 20 restricted as described above strongly affect the first-mode instability waves having a wavelength larger than twice that of the wavelength of modulations 20 in a supersonic boundary-layer flow, and the planar/axisymmetric Mack-mode instability waves in a hypersonic boundary-layer flow.

Figure 5:
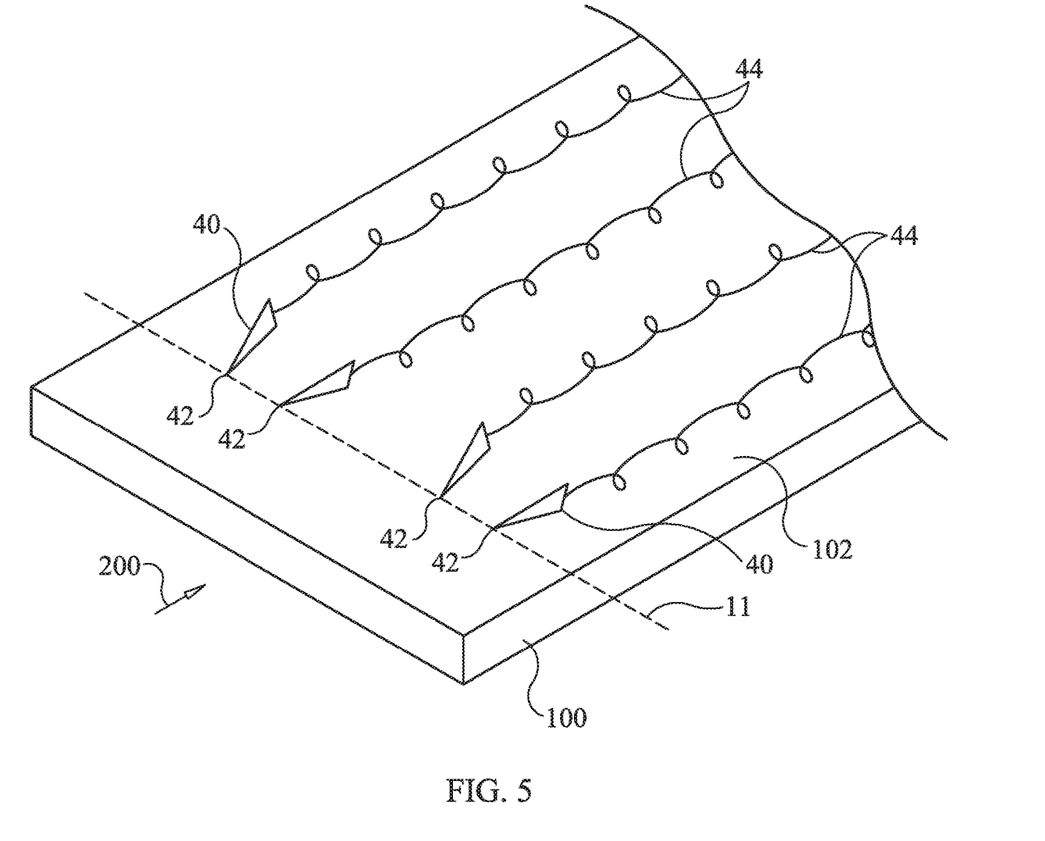
FIG. 5 is a schematic perspective view of a linear array of vortex generators for use as the flow disruptors in accordance with an embodiment of the present invention.

Referring first to FIG. 5, the flow disruptors of the present invention are realized by a linear array of (passive-device) vortex generators 40 aligned along the above-described spanwise line 11. Each vortex generator 40 can be a fixed protuberance extending partially into the thickness of flow 200. A variety of shapes and sizes of such protuberances can be used without departing form the scope of the present invention. By way of an illustrative example, each vortex generator 40 is constructed as a triangularly-shaped plate whose apex 42 defines the generator's leading edge in the streamwise direction. As flow 200 passes over/past each vortex generator 40, a vortex 44 is generated in flow 200. For purposes of modulation generation in accordance with the present invention, each vortex generator is sized/shaped/positioned such that vortices 44 spin a direction substantially perpendicular to the flow direction of flow 200. Further, in the illustrated embodiment, vortex generators 40 can be configured such that adjacent ones of vortices 44 are counter rotating.

Analysis of simulation results indicates that the spacing between the vortex generators 40 must be lower in the supersonic case as compared to the incompressible case because of the obliqueness of the first-mode waves and the required destabilization of the first-mode with twice the wavelength of the modulation. The analysis of simulation results for hypersonic boundary layer flow also indicate that the spacing between the vortex generators 30 must be lower in the hypersonic case as compared to the incompressible case because of a much greater stabilization effect on the planar/axisymmetric Mack-mode waves. More specifically, simulation results indicate that for the present supersonic case, vortex generators 40 should be equidistantly spaced in the spanwise direction or along line 11.

Figure 6:
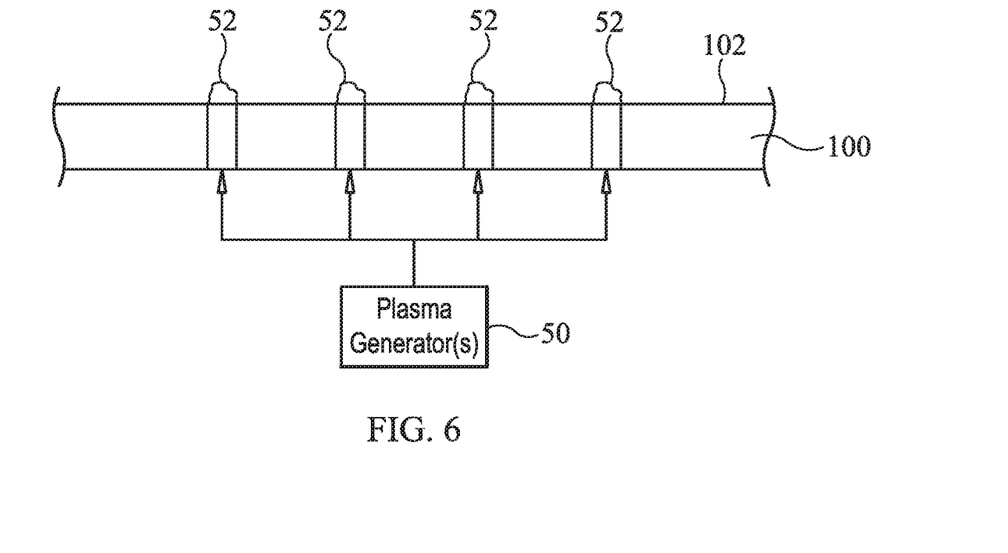
FIG. 6 is a schematic view of plasma generators for introducing a linear array of spaced-apart plasmas into the boundary layer for use as the flow disruptors in accordance with another embodiment of the present invention.
Figure 7:
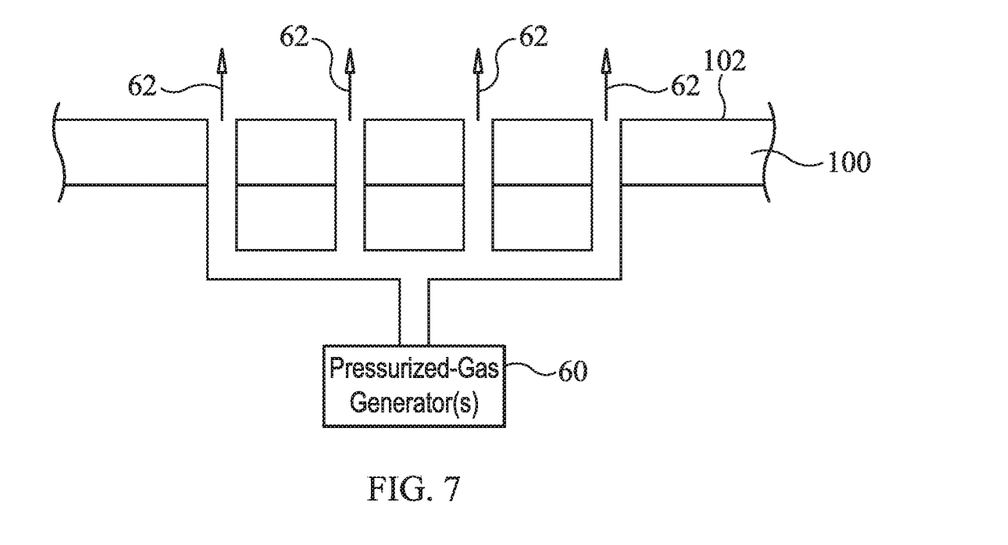
FIG. 7 is a schematic view of a pressurized gas system for injecting a linear array of spaced-apart pressurized-gas jets into the boundary layer for use as the flow disruptors in accordance with another embodiment of the present invention.

Referring now to FIG. 6, one or more plasma generator(s) 50 are provided, for example, within aerodynamic body 100. In this embodiment, plasma generator(s) 50 are controlled to introduce plasma 52 at each of the prescribed flow disruptor locations such that plasma 52 interacts with flow 200 traveling over surface 102. In FIG. 7, one or more pressurized-gas generators 60 are provided, for example, within aerodynamic body 100. In this embodiment, pressurized-gas generator(s) 60 are controlled to inject a gas jet 62 into flow 200 at each of the prescribed flow disruptor locations such that each jet 62 interacts with flow 200 traveling over surface 102. The embodiments illustrated in FIGS. 6 and 7 are representative of active-device flow disruptors. Similar to passive flow disruptors, the active flow disruptors (e.g., plasmas 52 and gas jets 62) are equidistantly spaced in the spanwise direction.

The advantages of the present invention are numerous. The laminar flow enhancement provided by the present invention disrupts intrinsic flow characteristics to provide an extended stabilization of oblique first-mode instability waves in supersonic boundary layer flows, and planar/axisymmetric Mack mode instability waves in hypersonic boundary layer flows. The flow disruptions can be generated using passive means such as suitable surface topography structures, or using active but low cost actuation. The present invention introduces a novel paradigm for BLT delay on supersonic wings, empennages, fuselage noses, or engine nacelles and hypersonic smooth surface vehicles by introducing spanwise modulation of the boundary layer flow to exploit its stabilizing effect on BLT-causing portions of the first-mode instability spectrum (supersonic) and Mack mode instability spectrum (hypersonic). Delaying the BLT onset results in significantly lower aerodynamic drag, which leads to a cascade of benefits in terms of increased range, lower weight that can lead to increased payload capacity, reduced emissions and noise radiation, reduced aerodynamic heating, reductions in cost, as well as a weaker sonic boom signature. The apparatus and method of the present invention are easy to implement. Implementation can occur either in standalone mode or in conjunction with other laminar flow devices to further augment the region of laminar flow. In the context of supersonic wings/hypersonic smooth surface vehicles, this laminar flow concept is applicable to both low-sweep and highly-swept configurations within regions where the oblique first-mode instabilities/planar/axisymmetric Mack mode dominate instability amplification. The present invention's teaching of the interaction of oblique first-mode instability waves with three-dimensional and stationary flow modulation of a supersonic boundary layer flow is brand new in the field of aerodynamics. The present invention's teaching of the substantial transition delay that can be achievable via three-dimensional and stationary flow modulation of a hypersonic boundary layer flow, as well as the teaching of the most convenient flow disruptor configurations for transition delay in hypersonic boundary layer flows, are also brand new in the field of aerodynamics.

What is claimed is:

1. An apparatus for delaying the laminar-to-turbulent transition of a supersonic boundary layer flow, comprising:
   a plurality of flow disruptors adapted to be in contact with a boundary layer flow moving in a flow direction over a surface wherein oblique first-mode instability waves present in the boundary layer and propagating at an oblique angle relative to the flow direction cause a laminar-to-turbulent transition in the boundary layer flow, the instability waves having a wavelength associated therewith in a direction perpendicular to the flow direction, said flow disruptors generating modulations within the boundary layer flow wherein a modulation wavelength of said modulations is less than one-half of said wavelength of the instability waves.

2. The apparatus of claim 1, wherein said plurality of flow disruptors comprise at least one linear array of spaced-apart flow disruptors, and wherein each said linear array extends approximately perpendicular to the flow direction of the boundary layer flow.

3. The apparatus of claim 1, wherein each of said flow disruptors comprises a physical structure adapted to be coupled to the surface and extend only partially into the boundary layer flow.

4. The apparatus of claim 3, wherein said physical structure comprises a vortex generator, wherein vortices are generated by said vortex generator in the boundary layer flow and wherein said vortices spin in a direction substantially perpendicular to the flow direction of the boundary layer flow.

5. The apparatus of claim 1, wherein said plurality of flow disruptors comprises a corresponding plurality of vortex generators spaced equidistantly along a line extending approximately perpendicular to the flow direction.

6. The apparatus of claim 1, wherein each of said flow disruptors comprises a plasma adapted to be introduced into the boundary layer flow at the surface.

7. The apparatus of claim 1, wherein each of said flow disruptors comprises a pressurized gas flow adapted to be injected into the boundary layer flow at the surface.

8. The apparatus of claim 1, wherein said modulations extend approximately perpendicular to the flow direction.

9. An apparatus for delaying the laminar-to-turbulent transition of a supersonic boundary layer flow, comprising:
   a plurality of flow disruptors adapted to be in contact with a boundary layer flow moving in a flow direction over a surface wherein a portion of oblique first-mode instability waves present in the boundary layer and propagating at an oblique angle relative to the flow direction cause a laminar-to-turbulent transition in the boundary layer flow, the portion of the instability waves extending perpendicular to the flow direction and having a wavelength associated therewith in a direction perpendicular to the flow direction, said flow disruptors arranged approximately perpendicular to the flow direction, said flow disruptors generating modulations within the boundary layer flow that are perpendicular to the flow direction and have a modulation wavelength associated therewith wherein peaks of said modulations align with the flow direction and troughs of said modulations align with the flow direction, said flow disruptors controlling said modulation wavelength to be less than one-half of said wavelength of the portion of the instability waves.

10. The apparatus of claim 9, wherein said plurality of flow disruptors comprise at least one linear array of spaced-apart flow disruptors, and wherein each said linear array extends approximately perpendicular to the flow direction of the boundary layer flow.

11. The apparatus of claim 9, wherein each of said flow disruptors comprises a physical structure adapted to be coupled to the surface and extend only partially into the boundary layer flow.

12. The apparatus of claim 11, wherein said physical structure comprises a vortex generator, wherein vortices are generated by said vortex generator in the boundary layer flow and wherein said vortices spin in a direction substantially perpendicular to the flow direction of the boundary layer flow.

13. The apparatus of claim 9, wherein said plurality of flow disruptors comprises a corresponding plurality of vortex generators spaced equidistantly along a line approximately perpendicular to the flow direction.

14. The apparatus of claim 9, wherein each of said flow disruptors comprises a plasma adapted to be introduced into the boundary layer flow at the surface.

15. The apparatus of claim 9, wherein each of said flow disruptors comprises a pressurized gas flow adapted to be injected into the boundary layer flow at the surface.

16. A method for delaying the laminar-to-turbulent transition of a supersonic boundary layer flow, comprising the steps of:
provating a boundary layer flow moving in a flow direction over a surface wherein oblique first-mode instability waves present in the boundary layer and propagating at an oblique angle relative to the flow direction cause a laminar-to-turbulent transition in the boundary layer flow, the instability waves having a wavelength associated therewith in a direction perpendicular to the flow direction; and
generating modulations within the boundary layer flow wherein a modulation wavelength of said modulations is less than one-half of said wavelength of the instability waves.

17. The method of claim 16, wherein said step of generating occurs along at least one linear location arranged approximately perpendicular to the flow direction of the boundary layer flow.

18. The method of claim 16, wherein said step of generating is accomplished with physical structures coupled to the surface and extending only partially into the boundary layer flow.

19. The method of claim 18, wherein said physical structures comprise vortex generators, wherein vortices are generated by said vortex generators in the boundary layer flow and wherein said vortices spin in a direction substantially perpendicular to the flow direction of the boundary layer flow.

20. The method of claim 19, wherein said vortex generators are spaced equidistantly along a line approximately perpendicular to the flow direction.

21. The method of claim 16, wherein said step of generating comprises the step of introducing plasmas into the boundary layer flow at the surface.

22. The method of claim 16, wherein said step of generating comprises the step of injecting pressurized gas flows into the boundary layer flow at the surface.

23. The method of claim 16, wherein said modulations extend perpendicular to the flow direction.

* * * * *